Sept. 20, 1971  H. W. JONES  3,605,176
CROSS FLEXURE HINGE
Filed Feb. 20, 1969
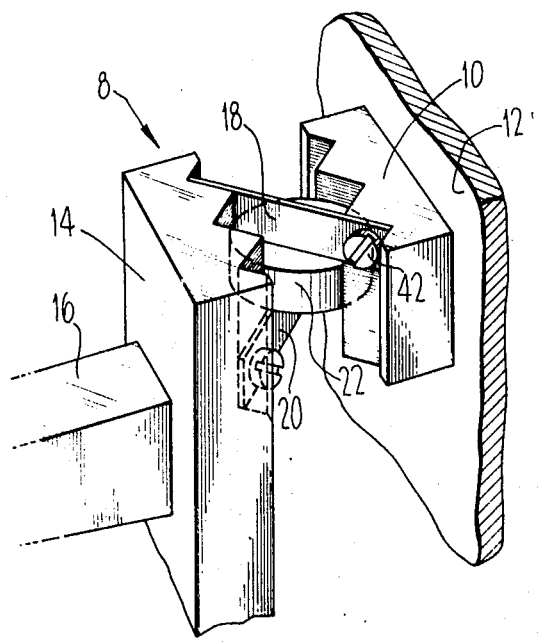
Fig_1
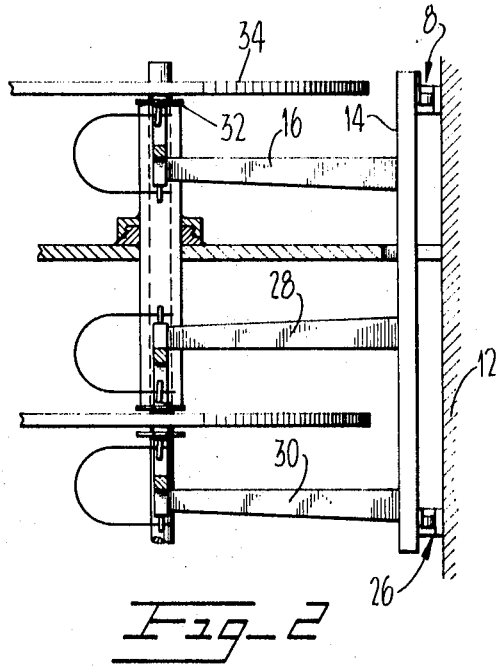
Fig_2
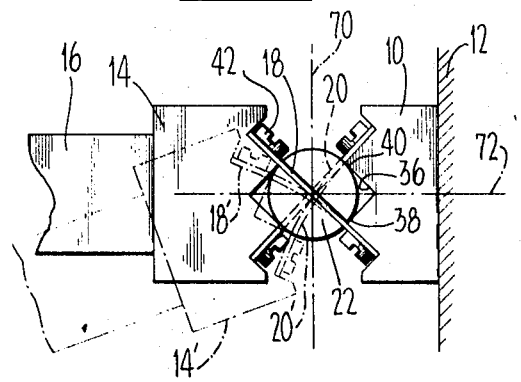
Fig_3
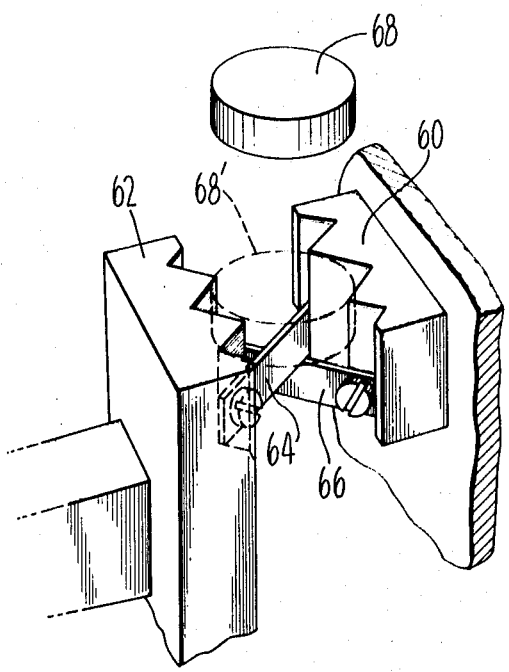
Fig_5
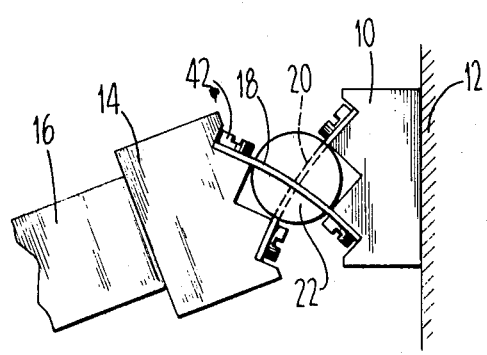
Fig_4
INVENTOR.
Henry W. Jones
BY
Karl H. Sommermeyer
ATTORNEY

United States Patent Office 3,605,176
Patented Sept. 20, 1971

3,605,176
CROSS FLEXURE HINGE
Henry W. Jones, Castro Valley, Calif., assignor to
The Singer Company
Filed Feb. 20, 1969, Ser. No. 801,071
Int. Cl. E05f 1/12
U.S. Cl. 16—180   7 Claims

ABSTRACT OF THE DISCLOSURE

A hinge using cross flexure leaf springs is assembled by holding the hinged members snug against a cylindrical gauge and fastening the flexure elements. Preferably, the center of the gauge is aligned with the crossed centers of the flexure elements, and is retained in the assembly.

BACKGROUND OF THE INVENTION

Field of the invention

The present invention realtes to cross flexure hinges.

Description of the prior art

Flexure hinges, including cross-spring arrangements for use in instruments are known to reduce problems of wear, play and lubrication. A bibliographic survey is contained in the book "Flexure Devices" by P. J. Gerry, British Scientific Research Association, 1954. Such devices heretofore have required precision construction and have been weak against loads that imposed compressive forces on the flexure elements.

SUMMARY OF THE INVENTION

I provide a gauging spacer and a method for its use that permits accurate and precise construction of a flexure hinge using parts of lower precision. Preferably, the spacer is included as part of the hinge itself for limiting the compressional deflection imposed on the flexure members for thereby increasing the resistance of the structure to large accidental loads.

BRIEF DESCRIPTION OF THE DRAWINGS

These and other objects and advantages of my invention will be apparent from the following description of specific embodiments thereof, taken in connection with the accompanying drawings, wherein:

FIG. 1 is a pictorial view of a cross flexure hinge constructed according to my present invention;

FIG. 2 is an elevational view of a part of a surface-storage, magnetic-disc, data file for a computer, demonstrating an apparatus with which my present invention is advantageous;

FIG. 3 is a plan view of the hinge of FIG. 1;

FIG. 4 is a view similar to FIG. 3 showing the hinge in a different position; and FIG. 5 is a pictorial view of a modified hinge constructed according to my present invention.

DESCRIPTION OF A PREFERRED EMBODIMENT

FIG. 1 is a pictorial view of a flexure hinge employing the preferred construction of my invention. There, a hinge 8 includes a hinged member 10 mounted on a support 12. A second hinged member 14 carries a load, here represented by a projecting arm 16, and is supported from the stationary hinge member 10 by a pair of crossed leaf springs 18 and 20. A cylindrical spacer, or gauge, 22 lies between the two hinged members 10 and 14, and is trapped by the two springs 18 and 20.

Preferably, hinges, such as shown in FIG. 1, are used in pairs, as shown in FIG. 2. There the hinged member 14 is shown as a long, vertical bar, having the hinge 8 at its upper end and another similar hinge 26 at its lower end. The hinged member 14 carries three arms 16, 28 and 30, each of which supports a transducer head, such as 32, in flying, or operative, relationship with a rotating disc 34 of a magnetic, surface, data-storage device. The cross flexure hinge is particularly advantageous because it is deepndable, substantially frictionless, and requires no lubriction.

As is shown in the plan view of FIG. 3, the hinge 8 articulates by flexing the leaf springs 18 and 20. When the hinged member 14 and projecting arm 16 are in their solid line position in FIG. 3, the springs 18 and 20 are straight. Preferably the springs 18 and 20 are normally straight so that in this solid line position they not only have their minimum curvature, but also they have minimum stress. When the hinged member 14 turns as, for example, to the position of FIG. 4, which is also the dot-dash position 14' in FIG. 3, the two leaf springs 18 and 20 are flexed into curves, as indicated at 18' and 20' in FIGS. 3 and 4.

To realize the full advantage of a cross flexure hinge, it is necessary that it be precisely aligned. For example, in the apparatus of FIG. 2, the permissible variation in the spacing between the arm 16 and disc 34, as the arm 16 swings between the center and rim of the disc 34, is a few thousandths of an inch. Accordingly, the upper and lower hinges 8 and 26 must be precisely aligned to operate similarly.

In accordance with my invention, the required precision of assembly is achieved easily and economically by the provision of the gauge, or spacer, 22. Grooves, such as 36, are provided in the two hinged members 10 and 14. The round gauge member 22 lies in these grooves. For assembly, the movable hinged member 14 is swung to the position shown in solid lines in FIG. 3, in which position the crossed leaf springs 18 and 20 have minimum curvature. The two hinged members 10 and 14 are then held snug against the gauge 22, and the cap screws, such as 42, are tightened for holding the springs 18 and 20 accurately in place.

Preferably, the groove 36 is a ninety-degree groove, and provides gauging faces, such as 38 and 40, that are substantially tangent to the position to be occupied by the cylindrical gauge 22, as seen in the plan view of FIG. 3. The positions of these gauging faces such as 38 and 40 are substantially aligned with the flexure springs 18 and 20. Preferably, the two flexure springs 18 and 20 are identical.

As viewed along the axis of the hinge when the flexure springs 18 and 20 have their minimum curvature, as shown by the solid lines of FIG. 3, the springs 18 and 20 cross each other at right angles at their centers, the center of spacer 22 coincides with this crossing point, and the pattern of the springs 18 and 20 and the gauge points such as 38 and 40 are symmetrical about that point of crossing and also symmetrical across planes at 70 and 72 which pass through that point of crossing.

As the hinge articulates, as when the hinged member 14 and arm 16 in FIG. 3 swing from the solid line to the dot-dash line position, the point of crossing of the springs 18 and 20, and also the instantaneous center of rotation of hinged member 14, move.

In the alternative construction shown in FIG. 5, hinged members 60 and 62 are connected by flexure springs 64 and 66. The removable gauge member 68 may be set into position 68', shown in dotted lines, for facilitating accurate alignment of the hinged members 60 and 62, and the flexure springs 64 and 66, during assembly. Thereafter, the gauge 68 may be removed.

However, I prefer the construction of FIG. 1 wherein the cylindrical gauge 22 is trapped between the two flexure springs 18 and 20 and so remains a part of the final assembly. I have found that if the two hinged members 10 and 14 are placed in the relative position such that the springs 18 and 20 are straight, as shown in FIG. 3, and if the springs 18 and 20 are adjusted and clamped to hold the hinged members 10 and 14 snug against the gauge 22 in this position, as previously described, then, when in use, the hinged members 14 and arm 16 are swung to either side from this central position, as, for example, to the deflected position 14' in FIG. 3, the gauge 22 will become slightly loose. Accordingly, the gauge 22 imposes substantially no frictional restraint on the action of the hinge. Leaving the gauge 22 in place, enables it to block deflections that would buckle the leaf springs 18 and 20. The cross flexure spring construction is much less rigid and much less strong against forces that impose compression on the leaf springs 18 and 20 than it is against forces that impose tension. Such compressive forces load the leaf springs 18 and 20 as columns and tend to buckle them. By keeping the gauge 22 in place, as shown in FIG. 1, I substantially eliminate the danger of such buckling of the leaf springs 18 and 22 by accidental blows or forces applied to the hinged structure.

I claim:

1. A cross flexure hinge construction comprising in combination,
   two hinged members,
   two flexure members crossing each other at their centers and connecting said hinged members,
   each of said flexure members having its fastening to at least one of said hinged members adjustable, and
   a cylindrical spacer positioned between said hinged members for relieving said flexure members of compressive loads,
   each of said hinged members having two gauging surface points positioned thereon for containing and embracing said cylindrical spacer therebetween centered at the crossing of and lying between said flexure members for retention thereby.

2. A cross flexure hinge construction according to claim 1 wherein, when said flexure members have minimum curvature, said flexure members and said gauging points embracing said cylindrical spacer are symmetrical across a plane through the crossing of said flexure members, as viewed along the axis of the hinge.

3. A cross flexure hinge construction according to claim 1 wherein, when said flexure members have minimum curvature, said flexure members and said gauging points, as viewed along the axis of the hinge, are symmetrical about the axis of crossing of said flexure members.

4. A cross flexure hinge construction according to claim 1 wherein, as viewed along the axis of the hinge when said flexure members have minimum curvature,
   diametrically opposed gauging points embracing said cylindrical spacer are aligned with
   said flexure members and said flexure members lie at right angles to each other.

5. A cross flexure hinge construction comprising in combination,
   a pair of hinged members,
   two flexure members crossing each other at their centers and connecting said hinged members,
   each of said hinged members having a groove extending parallel to the axis of the hinge and between the point of fastening of said flexure members to said hinged members, and
   a round gauge for engagement in each of said grooves having its axis centered at the crossing of said flexure members, said round gauge being disposed between said hinged members for relieving said flexure members of compressive loads.

6. A cross flexure hinge construction according to claim 5 wherein said groove in each of said hinged members is V-shaped and said round gauge is engaged with the walls of said V-shaped grooves.

7. A cross flexure hinge construction according to claim 6 wherein said round gauge is a cylindrical spacer embraced by the wall surfaces of said V-shaped grooves in said hinged members with the axis of said cylindrical spacer centered at the crossing of said flexure members.

References Cited
UNITED STATES PATENTS

| | | | |
|---|---|---|---|
| 2,611,659 | 10/1952 | Hadley | 16—150 |
| 3,501,800 | 3/1970 | O'Dea | 16—150 |

BOBBY R. GAY, Primary Examiner

D. L. TROUTMAN, Assistant Examiner